Jan. 19, 1965     E. VEROLI     3,166,269
FISHING REEL WITH FRICTION CLUTCH
Filed Dec. 10, 1962     5 Sheets-Sheet 1
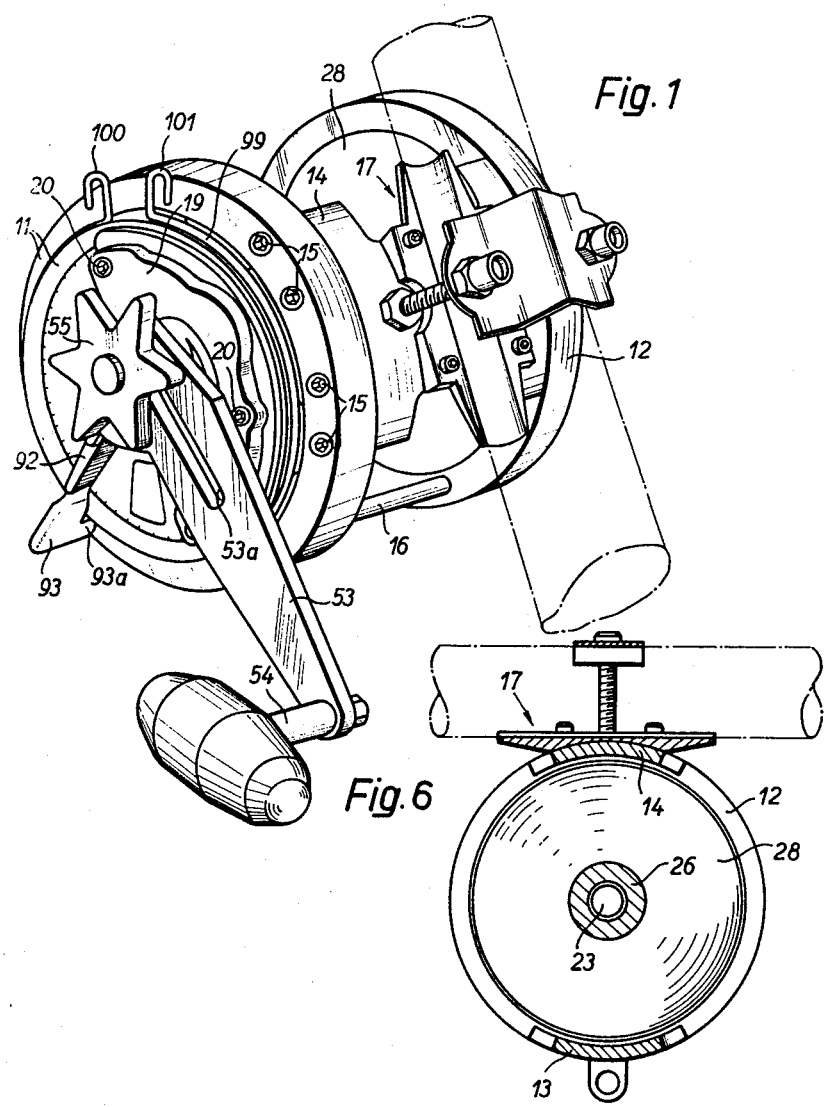

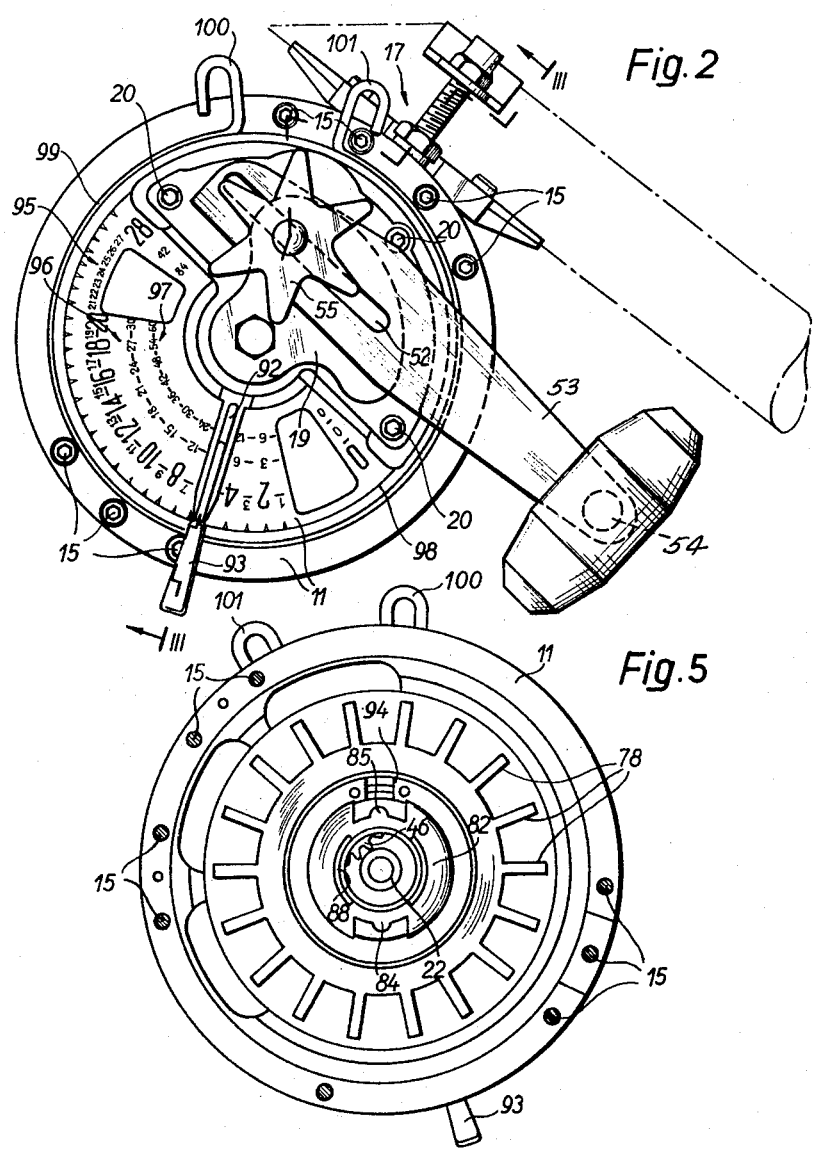

Jan. 19, 1965  E. VEROLI  3,166,269
FISHING REEL WITH FRICTION CLUTCH
Filed Dec. 10, 1962  5 Sheets-Sheet 3
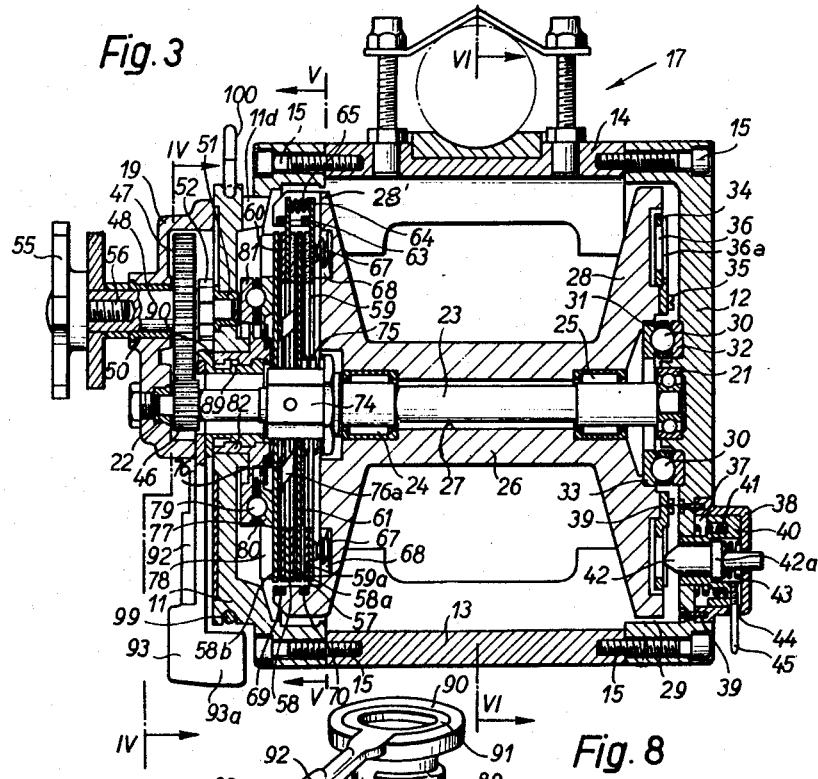
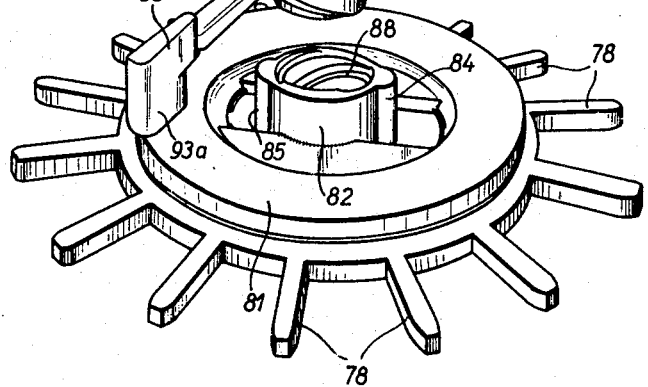

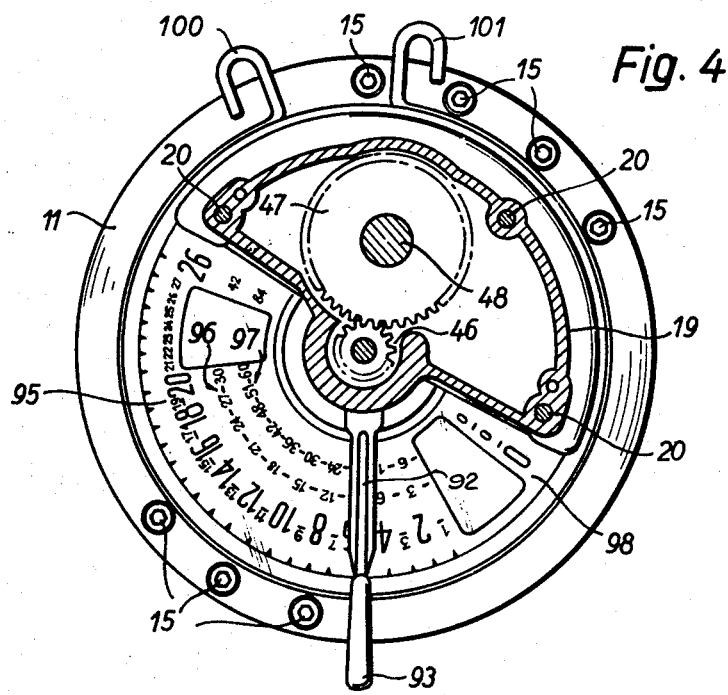

United States Patent Office 3,166,269
Patented Jan. 19, 1965

3,166,269
FISHING REEL WITH FRICTION CLUTCH
Elio Veroli, 21/23 Via B. Franklin, Modena, Italy
Filed Dec. 10, 1962, Ser. No. 243,407
Claims priority, application Italy, Jan. 5, 1960,
233/60, Patent 623,169
4 Claims. (Cl. 242—84.54)

This is a continuation-in-part of application Serial No. 79,045 filed Dec. 28, 1960, now abandoned, claiming priority from Italian patent application Ser. No. 233/60 filed Jan. 5, 1960 in the name of Elio Veroli.

This invention relates to a fishing reel for catching big fish which is provided, in the mechanism connecting the driving crank actuated by the fisherman, with a spool rotatably mounted in the stationary body of the fishing reel on which the line is wound, having an adjustable friction coupling which also acts as a brake for the spool during fishing operations.

The adjustable friction coupling acts as a limiting device for the torque which can be transmitted from the crank driven shaft to the spool, and also as a brake when the crank is held stationary and the line unwinds from the spool when strongly pulled by the hooked prey. The purpose of said coupling is to prevent the line from being subjected during fishing to traction exceeding its breaking strength. This admissible breaking strength of the line is of course a primary factor in determining adjustment of the friction coupling or, more exactly, in determining the maximum torque which the friction coupling should be capable of transmitting before slipping takes place between its cooperating friction members. Depending upon each type of line, the breaking strength properties of which are of course known, the position of the friction coupling adjusting member can therefore be so selected as to determine said maximum torque which the friction coupling should be capable of transmitting.

An adjustment effected taking care of the breaking strength property of the line only is in practice unsatisfactory. It should be considered that the diameter of the line coil wound on the spool continuously varies during the fishing operations, namely between a maximum corresponding to the outer diameter of the side flanges of the spool and a minimum corresponding to the outer diameter of the tubular cylindrical central spool portion. It will be easily understood that, the traction on the line remaining nevertheless constant, torques differing in values can be transmitted to the friction coupling during fishing, the torques increasing as the radius of the coil wound on the spool decreases. When the adjustment is effected as explained above and the line is changed, adjustment of the friction coupling should be effected taking care of the values of the resisting torque which is transmitted by the spool to the friction coupling and vice-versa which will be involved when the coil on the spool is of minimum diameter and assuming the traction stress to which the line is subjected is always somewhat below the traction stress causing breakage thereof. This would afford an absolute safety against breakage of the line and loss of the hooked fish prey; however, the inherent breaking strength property of the line would be unsatisfactorily utilized with all coil diameters exceeding the minimum diameter, and possibilities afforded by the provision of the friction coupling would similarly be deficiently utilized both during winding of the line on the spool and during braking upon unwinding of the line.

Present fishing reels were designed without recognizing the fact that adjusting of the friction coupling provided in the fishing reel should be varied during the fishing operations in order to afford at any time the maximum admissible utilization of the breaking strength of the line or, in other words, that adjustment of the friction coupling should continuously vary in such manner that the torque the coupling can transmit before mutual slipping of its friction members starts, is the greatest torque attainable before traction stresses arise in the line exceeding the breaking strength of the latter.

In order to vary in this manner the adjustment of the friction coupling during the fishing operations it is first of all essential to know, with a given type of line, the breaking strength of which is known, the position which the control member for adjusting the friction coupling should take at various coil diameters. The knowledge of these positions is in fact essential for the purpose of adjusting the friction coupling at the said coil diameters in such manner as to transmit a maximum torque only slightly below the torque under which the line can be subjected to traction stresses exceeding its breaking strength. For this purpose it is further essential for the friction coupling to be such that at the various positions of its adjustment member there correspond exactly determined constant values of the maximum torque which the coupling is capable of transmitting before slipping of its friction members starts.

An object of this invention is therefore to provide a fishing reel of the type referred to above, having means for gradually adjusting the value of the maximum torque which the friction coupling is capable of transmitting before mutual slipping of its friction members begins, and further provided with means indicating to the user, for the various positions of the abovementioned control member, the traction stresses which can be set up in the line before slipping of the friction coupling, referred to a plurality of diameters of the line coil wound on the spool.

A further object of this invention is to provide a fishing reel of the type referred to above, the friction coupling of which is such as to cause at any position of the control member for adjustment of the friction coupling a constant maximum value of the torque which the friction coupling is capable of transmitting when slipping place begins.

The above and further objects and consequent advantages of this invention will be understood from the appended description referred to the accompanying drawings which show an embodiment of the fishing reel, and wherein:

FIGURE 1 is a perspective view of the improved fishing reel,

FIGURE 2 is a view thereof from the crank side,

FIGURE 3 is a sectional view on line III—III of FIGURE 2,

FIGURES 4, 5 and 6 are sectional views on lines IV—IV, V—V, VI—VI of FIGURE 3,

FIGURE 8 is a perspective view of a constructional detail of the fishing reel on an enlarged scale, FIGURE 9 is a perspective view of a further constructional detail of the fishing reel.

Figure 7:
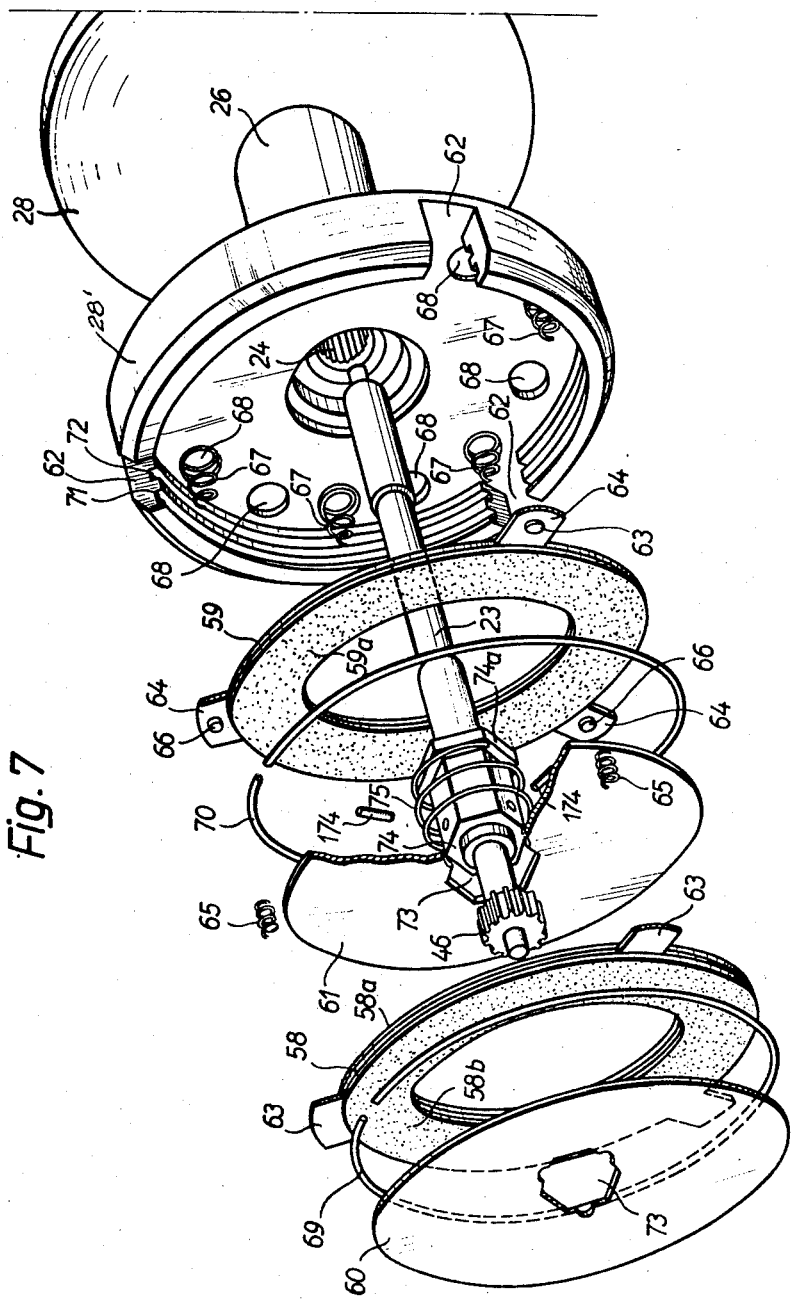
FIGURE 7 is an exploded perspective view of the fishing reel spool and friction coupling cooperating therewith.

The fishing reel shown on the drawings comprises a head end plate 11 and a tail end plate 12 each of shallow dish form. The end plates are fixedly mounted in a spaced relationship by virtue of cross members 13, 14 of circular segment cross sectional shape (FIGURE 6) secured to the axial peripheral flanges of the end plates by means of screws 15. The plates 11, 12 are moreover interconnected by a cylindrical rod 16 (FIG. 1) which is similarly secured by means of screws to the axial flanges on the plates 11, 12. The cross member 14 carries clamping members generally denoted by 17 (FIGURES 1, 3 and 6) serving for attachment of the fishing reel to a fishing rod.

The head end plate 11 carries an outer cover plate 19, the function of which shall be described hereafter, secured to the plate 11 by means of screws 20 (FIGURES 1, 2 and 4). The tail end plate 12 carries in proximity to its middle point a ball bearing 21 and a bushing 22 coaxial with the bearing 21 is forced into a matching seat in the cover 19. The bearing 21 and bushing 22 rotatably support the ends of the main shaft 23 of the fishing reel. The shaft 23 has mounted thereon needle bearings 24, 25, respectively rotatably supporting the spool 26 having an inner surface 27 which defines a hollow for the shaft 23 and seats for the bearings 24, 25. The side flanges 28 and 28' of the spool are arranged within the hollows in the end plates 11 and 12, respectively, of the fishing reel, and leave a slight radial clearance 29 with respect to the annular axial extensions of said plates. The flange 28 of the spool bears against the end plate 12 through the interposition of balls 30 held by a cage 31. The balls 30 roll in annular tracks formed in a ring 32 forced into the plate 12 and in a ring 33 concentrical with the former forced into the side wall 28 of the spool. The side wall 28 moreover carries on the same side a metal ring 34 secured to the flange 28 by means of screws 35. The ring 34, the central opening of which is of a diameter exceeding the outer diameter of the thrust bearing 30, 31, 32 has bored therethrough a circular row of holes 36 equally spaced and alternating with radial ribs 36a. A cylindrical recess 37 is formed in the outer wall of the plate 12 and connects at its bottom with a concentrical bore extending through the width of the plate 12. A tumbler-shaped member 38 is fitted into the hollow 37 and is secured to the plate 12 by means of screws 39. The length of the tumbler 38 is such that its bottom projects from the outer wall of the plate 12. A further cup-shaped member 40 is slidably mounted within the tumbler 38 and has a hub fitted into the through bore in the bottom of the recess 37. The member 40 is constantly urged towards the bottom of the tumbler 38 by a coiled spring 41 and is formed itself with a through bore comprising a larger diameter section nearer the bottom of the tumbler 38 and a smaller diameter section bored through its hub. The smaller diameter section of said bore has slidably mounted therein a pin 42 with a rounded tip at the pin of end facing the spool. The pin 42 is formed with a collar 42a accommodated by the larger diameter section of the abovementioned through bore and biassed by a small spring 43 bearing on the bottom of the tumbler 38 and coiled about a smaller diameter extension of the pin 42 projecting outwardly through a hole in the bottom of the tumbler 38. A helical slit 44 is cut in the side wall portion projecting from the plate 12 of the tumbler 38 and has extending therethrough to the outside of the tumbler 38 a small lever 45 screwed to the cup-shaped member 40. The structure is so arranged that the axis of the pin 42 extends through the middle diameter of the holes 36 in the ring 34. By rotating the lever 45 about the axis of the pin 42 the cup-shaped member 40 can be drawn towards and away from the flange 28 on the spool, thereby causing the rounded tip on the pin 42 to engage the ring 34 or disengage therefrom. When the tip of the pin 43 is in its forward position with respect to the ring 34, it reaches during rotation of the spool into the holes 36 under the bias by the spring 43 and resiliently recedes over the ribs 36a of the ring 34 separating the holes 36. Under these conditions the fishing reel emanates a characteristic noise which indicates rotation of the spool.

The main shaft 23 carries near its end which is rotatably mounted in the bushing 22 a small toothed wheel 46 arranged within the chamber confined between the outer face of the head end plate 11 and the cover plate 19. The toothed wheel 46 meshes with a larger toothed wheel 47 keyed to a shaft 48 rotatably mounted in a bushing 50 forced into the wall of the cover 19 and in a bushing 51 forced into a seat provided in the plate 11.

A further ratchet wheel 52 is keyed to the shaft 48 near the toothed wheel 47 and is adapted to cooperate with spring-urged pawls (not shown) which can be secured to the plate 11 when the rotation of the shaft 48 should be by a knob and in only one direction of rotation. The shaft 48 extends externally of the cover plate 19 and ends on this side by a section of rectangular cross sectional shape reaching within the slit 53a in the arm 53 of the crank 54. A star knob 55 having a screw threaded shank 56 screwed into a tapped hole in the shaft 48 secures the arm 53 of the crank to the shaft 48.

For transmitting motion from the main shaft 23 to the spool a friction coupling is arranged in a cylindrical recess 57 in the side wall 27 of the spool 26 opening towards the head end plate 11. The friction coupling comprises a number of thin metal annular discs, in the construction shown two discs 58, 59 fast in rotation with the spool 26 and two thin metal discs 60, 61, respectively fast in rotation with the shaft 23. In order to effect a mounting of the discs 58, 59 in the spool flange 28 capable of preventing a relative rotation of said discs and spool, but admitting relative axial displacements thereof, radially extending recesses 62 are cut (FIG. 7), in the front of the side wall confining the chamber 57.

Rectangular peripheral tongues 63, 64 provided on the annular discs 58, 59, respectively, reach into these recesses which are of constant width with in an axial direction of the spool. Small helical springs 65 are arranged between the tongues 63, 64 on the discs 58 and 59 and are guided on axial pins 66 carried by the tongues 64. The springs 65 constantly tend to urge the annular discs 58, 59 apart, thereby simultaneously tending to remove them from the disc 61 fast in rotation with the shaft 23. The annular disc 59 carries on its side facing the disc 61 an annular lining 59a made of a material of a high friction coefficient. Similar linings 58a, 58b are provided on the annular disc 58 on its sides facing the discs 61, 60, respectively.

The annular disc 59 is further constantly urged towards the disc 61 by a plurality of spiral springs 67 arranged in a circular row around the shaft 23. The large diameter portion of each of said spring 67 is accommodated by a circular recess 68 in the bottom wall of the chamber 57 provided in the side wall 27 of the spool. The movement of the annular discs 58, 59 in an axial direction is limited by the provision of resilient expanding split rings 69, 70 seated in grooves 71, 72 cut in the circumferential inner wall of the recess 57. The groove 72 may be of a greater width than the groove 71, and may extend towards the bottom of the chamber or cavity 57 and even reach said bottom for insuring a free axial displacement of the annular disc 60 towards the said bottom. The discs 60, 61 are coupled for axial displacement and fast in rotation through the special configuration of their central openings 73 (compare FIGURE 7), with a lug 74 in the form a hexagonal bored nut fitted on the shaft 23 and locked to the latter. The disc 61 is constantly urged against pins 174 secured to the lug 74 by a spring 75 bearing against a radial flange 74a on the plug 74. The position of the pins 174 is so chosen that the disc 61 is spaced from the discs 58 and 59 when the coupling is inactive. The lug 74 has axially displaceably fitted thereon a thin resilient annular disc 76 of a diameter smaller than the inner diameter of the annular disc 58 and having bent over circumferential portions 76a inclined in an axial direction and turned towards the disc 61 when the thin disc 76 is mounted in its operative position in the reel.

The function of the thin disc 76 and of the springs 65, 67 and 75 is to maintain spaced the discs 58, 59, 60 and 61 when the coupling is inoperative and promote prompt release of the various cooperating friction surfaces on the friction coupling discs on uncoupling of the shaft 23 and spool 26, and further to provide that the engagement between the various friction surfaces of the discs 60, 58, 61 and 59 happens successively thereby progressively increasing the maximum torque transmissible before the coupling slips.

On the side of the disc 60 near the head end plate 11 a ring 77 is rotatably mounted in a manner to be described hereafter and is provided with a plurality of radial circumferential blades 78. The function of the blades 78 is to promote an air circulation at the region of the friction coupling in order to cool the coupling. The blades 78 may have their ends made with greater axial width than shown on the drawings to act more efficiently as air agitators. The air thrust by the blades can escape to the outside through circumferential slits 11d cut in the plate 11 (FIG. 9). The face of the ring 77 turned towards the plate 11 has cut therein an annular groove forming a rolling track for a plurality of balls 79 kept in a spaced relationship by a circular segment 80 made of sheet metal and having holes bored therethrough to pass the balls. The balls 79 are further guided in a groove cut in the peripheral portion of a disc 81 supported by the plate 11. The disc 81 has a hub portion 82 inserted into an opening 83 (FIG. 9) in the bottom wall of the plate 11 the assembly being such that the hub is capable of axial displacement but not of rotation with respect to the plate 11. The assembly is effected by providing the hub 82 on its circumference with two axial diametrically opposite ribs 84, 85 (FIG. 8) fitted in axial recesses 86, 87, respectively (FIG. 9) provided in the inner wall of the opening 83. The ring 77 is secured against axial displacement towards the disc 61 by means of a Seeger ring 94 (FIG. 5) fitted into a circumferential groove in the portion of the hub 82 extending towards the spool 26.

A double thread 88 is cut in the inner wall of the hub 82 on the disc 81 and engages a similar thread provided in the outer circumference of a brushing 89 surrounding the shaft 23 and entering the hub 82. The bushing 89 is terminated on its side near the cover plate 19 by a flange 90 in the end face of which a shallow annular seat is formed, the circumferential wall of which is notched (FIG. 8). The said annular seat receives a ring 91 carrying a radial arm 92 ending by a handle 93. The latter is formed with at protruding portion 93a which overlaps a small diameter portion of the outer circumference of the outer circumference of the plate 11.

The flange 90 on the bushing 89 is confined between the outer face of the plate 11 and the cover plate 19. Through this assembly the bushing 89 is capable of rotation but is kept against axial displacement with respect to the plate 11.

The face of the bottom wall of the plate 11 opposite the spool 26 is occupied in part only by the cover plate 19. A portion is left free over about 200° and is covered by a plate having marked thereon sets of gradually increasing numbers, arranged along three arcs of a circle 95, 96 and 97, respectively (FIG. 4). These numbers indicate in units of weight (kilograms or pounds) the traction stress which should be exerted on the line wound on the spool 26 to cause the friction coupling to slip when the spool diameter is maximum, minimum and intermediate, respectively and when the arm 92 covers one of the said numbers.

Said numbers can, however, be any conventional numbers related to the effective value of the pull on the line necessary to cause the friction coupling to slip when the diameters of the line spool are as above indicated. For rendering the use of the reel easier, on the inner faces of the flanges 28 and 29 are marked three circles (not shown) having diameters corresponding to the diameter of the line coil to be wound on the spool, to which are related the numbers marked along arcs 95, 96 and 97. The annular sections of the flange faces confined between said circles may be of different colors.

It will be obvious that rotation of the arm 92 rotates the bushing 89 and results in an axial displacement of the hub 82 and annular disc 81. On displacement of the annular disc 81 in the direction of the spool, a thrust acts on the disc 60 through the balls 79 and annular disc 77 and moves it with respect to the hexagonal lug 74 in the direction of the spool 26. This movement of the disc 60 brings it into frictional engagement with the annular disc 58. A further rotation of the arm 92 results in interengagement of the friction surfaces of the discs 58 and 61 in addition to interengagement of the friction surfaces of discs 60 and 58. This occurs because the springs 65 yield prior to springs 67 and 65. A still further rotation of the lever 92 in the same direction will cause interengagement of the friction surfaces of all discs 60, 58, 61 and 59. Obviously, the sequence of interengagement of the friction surfaces of various discs will depend upon the characteristics of the springs 65, 68, 75 and 76. In any case, after all discs 60, 58, 61 and 59 have come into mutual contact, the further annular disc 81 is moved towards the spool 26, the stronger is the mutual pressure on the discs and the higher is the torque required to cause the friction coupling to slip. By rotating the lever in a contrary direction, the annular disc 81 recedes and the friction members of the coupling are gradually drawn apart till they are fully separated under the action of the abovementioned springs. On release of the friction surfaces of the various coupling discs, no transmission of movement takes place between the spool 26 and transmission shaft 23 or vice-versa. This condition is attained by moving the lever 92 to the position denoted by the reference numeral 98 (FIG. 4), that is, in front of the indications O marked on each of the three arcs of circle, the number of which can be increased consistently with the size of the fishing reel.

In order to assist the operator in adjusting the coupling, the portion of the outer circumference of the plate 11, having overlapping thereon the projection 93a on the handle 93, is formed with an annular groove of V shape in cross-section having fitted therein a split ring of spring wire 99 provided at its ends with spaced section 100, 101 radially bent towards the outside and then on themselves. With this arrangement it is possible to displace the ring 99 only by pushing one of the sections 100, 101 away from the other section, otherwise the ring will be locked against sliding in the groove. The section 100 or 101 acts thereby as a stop for the lever 92 which cannot therefore be moved beyond a certain predetermined position, such as its position corresponding to the maximum admissible traction stress on the line with a given diameter of the coil wound on the spool, for example with its outer diameter.

What I claim is:
1. A fishing reel comprising in combination:
 (a) a stationary reel body,
 (b) a driving mechanism including a drive handle, a reducing gear assembly actuated by the drive handle, and a main drive shaft rotatably journaled in the reel body,
 (c) a line spool rotatably journaled on said main drive shaft,
 (d) an adjustable maximum torque limiting friction coupling disposed on one side face of said line spool and including two sets of driving and driven friction discs, one set of said discs being connected to said main shaft, the other set being connected to said line spool, and spring means for normally biasing and maintaining the discs in said two sets out of frictional engagement,
 (e) means including an adjusting lever operable from outside the stationary reel body for variably overcoming the action of the spring means for normally biasing and maintaining the discs of said two sets out of frictional engagement thereby controllably varying the maximum torque transmitted by the friction coupling before slipping, and
 (f) a graduated dial on the outside of the reel body adjacent a portion of the adjusting lever having a plurality of different scales each corresponding to a diameter of line package wound on the line spool for indicating the pull on the line corresponding to a setting of the adjusting lever.

2. A fishing reel as defined in claim 1, in which the friction coupling comprises:
   (g) said set of friction discs connected to said line spool includes at least two annular friction discs arranged within a cylindrical cavity provided in one of the sidewalls of the spool,
   (h) a number of peripheral tongues projecting outwardly from said annular discs into recesses cut in the annular side wall of said cavity, whereby said annular discs are rotatable with the spool and can be axially displaced with respect to the latter,
   (i) at least one disc adjacent to each of said annular discs on the side of the latter opposed to said spool, said disc being mounted on the main shaft of the fishing reel so it can be axially movable but not rotatable with respect to said main shaft,
   (k) resilient means normally biasing said annular discs and said disc adjacent the latter away from each other.

3. A fishing reel comprising in combination:
   (a) a stationary reel body,
   (b) a driving mechanism including a drive handle, a reducing gear assembly actuated by the drive handle, and a main drive shaft rotatably journaled in the reel body,
   (c) a line spool rotatably journaled on said main drive shaft,
   (d) an adjustable maximum torque limiting friction coupling disposed on one side of said line spool and including two sets of driving and driven friction discs, one set of said discs being connected to said main shaft, the other set being connected to said line spool, and means for maintaining the discs in said two sets out of frictional engagement,
   (e) means including an adjusting lever operable from outside the stationary reel body for stepwise overcoming the action of the means for maintaining the discs of said two sets out of frictional engagement thereby varying the maximum torque transmitted by the friction coupling before slipping,
   (f) a graduated dial having a plurality of different scales each corresponding to a diameter of the line coil wound on the line spool for indicating the pull on the line;
the said friction coupling comprises:
   (g) at least two annular friction discs arranged within a cylindrical cavity provided in one of the side walls of the spool,
   (h) a number of peripheral tongues projecting outwardly from said annular discs into recesses cut in the annular side wall of said cavity, whereby said annular discs are rotatable with the spool and can be axially displaced with respect to the latter,
   (i) at least one disc adjacent to each of said annular discs on the side of the latter opposed to said spool, said discs being mounted on the main shaft of the fishing reel so as to be axially movable but not rotatable with respect to said main shaft,
   (k) resilient means for maintaining said annular discs and said discs adjacent the annular discs spaced apart when said means for biasing said discs into frictional engagement are inoperative;

and said resilient means for maintaining said discs spaced when the means for biasing the latter into frictional engagement are inoperative further comprising:
   (l) springs interposed between peripheral tongues on said annular discs,
   (m) a number of springs interposed between one of said annular discs and the bottom of said cavity in one side wall of the spool,
   (n) spring means interposed between a collar on said main shaft and the disc arranged between said annular discs,
   (o) spring means interposed between said discs arranged adjacent said annular discs, and
   (p) means for limiting the displacements of said discs axially off the bottom of the cavity provided in one of the side walls of the spool.

4. A fishing reel comprising in combination:
   (a) a stationary reel body,
   (b) a driving mechanism including a drive handle, a reducing gear assembly actuated by the drive handle, and a main drive shaft rotatably journaled in the reel body,
   (c) a line spool rotatably journaled on said main drive shaft,
   (d) an adjustable maximum torque limiting friction coupling disposed on one side face of said line spool and including two sets of driving and driven friction discs, one set of said discs being connected to said main shaft, the other set being connected to said line spool, and spring means for normally biasing the discs in said two sets out of frictional engagement,
   (e) means including an adjusting lever operable from outside the stationary reel body for variably overcoming the action of the spring means for biasing the discs of said two sets out of frictional engagement thereby varying the maximum torque transmitted by the friction coupling before slipping,
   (f) a graduated dial on the outside of the reel body adjacent a portion of the adjusting lever, the dial including a plurality of different scales each corresponding to a diameter of line package wound on the line spool for indicating the pull on the line,
   (g) air circulating means within the stationary reel body rotatable with the friction coupling for circulating air to dissipate heat generated by slipping of the coupling, when the maximum torque limit is reached, and
   (h) circumferential slits in the stationary body of the reel for escape of the air circulated by said means.

References Cited by the Examiner
UNITED STATES PATENTS

| | | | |
|---|---|---|---|
| 1,233,561 | 7/17 | Dornfeld | 192—69 |
| 2,024,147 | 12/35 | Curtiss | 73—143 |
| 2,190,398 | 2/40 | Bugatti. | |
| 2,241,241 | 5/41 | Clouse | 192—113 |
| 2,255,703 | 9/41 | Grieten | 242—84.44 |
| 2,282,995 | 5/42 | Dumond | 242—84.44 |
| 2,531,610 | 11/50 | Butzman | 242—84.46 X |
| 2,760,736 | 8/56 | Milhalko et al. | 242—84.45 |
| 3,000,477 | 9/61 | Dunn | 242—84.44 X |
| 3,065,832 | 11/62 | Becknell | 192—113.1 X |

MERVIN STEIN, Primary Examiner.